United States Patent [19]

Maeda et al.

[11] Patent Number: 4,937,616
[45] Date of Patent: Jun. 26, 1990

[54] LIGHT SOURCE DEVICE FOR USE IN A COPYING MACHINE

[75] Inventors: Yasutaka Maeda, Ikoma; Taisuke Kamimura, Nara; Osamu Fujimoto, Yamatokooriyama; Tsuyoshi Miyamoto, Osaka; Masato Tokishige, Yamatokooriyama; Kazuyuki Ohnishi, Nara, all of Japan

[73] Assignee: Sharp Kabushiki Kaisha, Osaka, Japan

[21] Appl. No.: 352,983

[22] Filed: May 17, 1989

[30] Foreign Application Priority Data

May 17, 1988 [JP] Japan .................................. 63-119937

[51] Int. Cl.⁵ .............................................. G03B 27/54
[52] U.S. Cl. ........................................ 355/37; 355/70; 355/326
[58] Field of Search .............. 355/37, 35, 69, 326–328, 355/70

[56] References Cited

U.S. PATENT DOCUMENTS

| | | | |
|---|---|---|---|
| 3,887,279 | 6/1975 | Rubin | 355/70 X |
| 4,229,095 | 10/1980 | Mir | 355/326 X |
| 4,519,703 | 5/1985 | Lehman et al. | 355/69 |
| 4,670,779 | 6/1987 | Nagano | 355/37 X |
| 4,737,748 | 4/1988 | Ito | 355/70 X |
| 4,788,600 | 11/1988 | Marsiglio et al. | 355/70 X |

FOREIGN PATENT DOCUMENTS 59-151168 8/1984 Japan .
100137 6/1985 Japan .

Primary Examiner—Richard A. Wintercorn

[57] ABSTRACT

A light source device for use in a color copying machine comprises a plurality of light source lamps having different efficiencies respectively and means for lighting any number of light source lamp or lamps among said plural light source lamps depending on the luminous energy of the respective blue, green and red spectrums and/or the spectral sensitivity of the photosensitive member for said respective spectrums.

1 Claim, 7 Drawing Sheets

LIGHT SOURCE DEVICE FOR USE IN A COPYING MACHINE

BACKGROUND OF THE INVENTION

1. FIELD OF THE INVENTION

The present invention relates to a light source device for use in a color copying machine in which a light bundle is generated by the light source device toward an original document and in which a color-separation of the reflection light reflected by the original document is performed, thereby applying the color-separated light to a photo-sensitive member so as to form a color image.

DESCRIPTION OF THE PRIOR ART

In recent years, in various kinds of copying machines adopting an electro-photographic method, there is a kind of copying machine capable of forming a full color image. A full color image is formed in a manner as follows.

First, a reflection light reflected by an original document is applied to an optical color-separation filter through which a spectrum of a blue wavelength band is passed and projected onto a photo-sensitive member so as to form an electrostatic latent image. Subsequently, yellow toner is made adhere onto the electrostatic latent image and then the yellow toner adhering image is transferred to a transfer charger. Similarly, the reflection light reflected by the original document is applied to an optical color-separation filter through which a spectrum of a green wavelength is passed and projected onto the photosensitive member so as to form an electrostatic latent image, so that a magenta toner adhering image is formed to be transferred onto the yellow toner adhering image. Moreover, the reflection light reflected by the original document is applied to an optical color-separation filter through which a spectrum of a red wavelength is passed, so that a cyanic toner adhering image is formed to be transferred onto the yellow and magenta toner images. By these processes mentioned above, there is formed a compound image with yellow, magenta and cyanic toners, i.e., a full color image is formed on the transfer charger.

When a full color image is formed, the densities of the chromaticities of the three kinds of toner images with yellow, magenta and cyanic toners should be made regular and constant in order to prevent occurrence of a specific irregular coloration in the image to be formed. In other words, when an original document with the same density of the chromaticities of blue, green and red is copied, the density of the chromaticities of the three primary colors of the image to be formed should be made regular as those of the original document. However, in practical use, the above mentioned densities of the chromaticities of the three primary colors of the image to be formed are not made regular owing mainly to a spectral distribution of a light intensity generated by a light source and to a spectral sensitivity of the photosensitive member.

FIG. 1 shows a distribution of spectral intensities of a light emitted by a halogen tungsten lamp which is generally used as a light source lamp in a copying machine. As shown in FIG. 1, the distribution of the spectral intensities (relative energy ratio) of the light emitted by the halogen tungsten lamp of the light source becomes lower to higher as the wavelength band of the spectrum goes from the blue short spectrum to the red long spectrum.

FIG. 2 shows a distribution of spectral sensitivities of the photo-sensitive member provided in the copying machine, wherein the spectral sensitivities become highest at the green wavelength band and become lower in the ranges of the blue and red wavelength bands. Therefore, when an original document is copied to form an image thereof by a copying machine using the light source lamp and photo-sensitive member as mentioned above, the density of the chromaticity of the yellow toner image becomes rather higher compared to those of the magenta and cyanic toner images, and therefore, there has been a problem that the whole part of the image to be formed becomes rather yellow colored.

Therefore, there have been made various kinds of devices in order to increase the quantity of the spectral intensity of the blue wavelength band of the light emitted by the light source lamp in the prior art. For example, (1) there is employed a color-separation filter with high permeability for a spectrum of a blue wavelength band, (2) there is employed a color-separation filter permeable for a spectrum of a wavelength band shifted to rather a longer wavelength, (3) there are provided a plurality of light source lamps, (4) there is used a light source lamp with high efficiency (herein "lamp efficiency" means a ratio between a light energy and a consumed electric power of a lamp (lm/W)), and (5) power supply for a light source lamp is increased, whereby the quantity of the spectral intensity of a blue wavelength band of the light is increased.

However, the methods (1) to (5) mentioned above have faults respectively as follows.

(1) There is a limit (90% degree) for increasing the permeability of the light permeable filter, and therefore, it is impossible to perform a sufficient color correction.

(2) The reproductivity of the yellow and green colors of a document becomes worse because of the shift of the permeable wavelength band of the filter.

(3) The temperature inside the copying machine rises.

(4) The life of the light source lamp with high efficiency is reduced.

(5) Since the consumption power available in the entire parts of the copying machine is predetermined, a large increment of the consumption power can not be attained.

SUMMARY OF THE INVENTION

The present invention has been made considering the problem mentioned above, and an essential object of the present invention is to provide a light source device for use in a copying machine, wherein even in the case a spectrum of a wavelength band of a low value in a spectral distribution is projected, or a spectrum of a wavelength band for which the photosensitive member has a poor photosensitivity is projected, a large quantity of the spectrum can be obtained.

The present invention is characterized in that, in a copying machine for forming a color image of an original document by performing a color-separation of a reflection light which is projected from a lamp for light source and reflected by the original document so as to be applied onto a photosensitive member, there are provided a plurality of lamps for light source each having a different lamp efficiency of electric-photo conversion, and there is provided means for turning on any one or more lamps for light source of said plurality of light source lamps depending on the quantity of the spectrums in the light generated by the light source lamps and/or, on the spectral sensitivity of said photosensitive member.

In a light source device for use in a copying machine according to the present invention, the quantity of the light generated by the light source lamps can be appropriately controlled by changing the efficiency and the number of the light source lamps to be turned on depending on the quantity of the spectrums and/or on the spectral sensitivity of the photosensitive member. For example, in the case there is formed an image with a color toner by projecting a spectrum of a wavelength band corresponding to a low value in a spectral distribution of the light generated by the light source lamp, or in the case there is formed an image with a color toner corresponding to a spectral wavelength band for which the spectral sensitivity of the photsensitive member is low, there are used one or more light source lamps with good efficiency or the number of the light source lamps to be turned on is increased, and on the contrary, in the case there is formed an image with a color toner corresponding to a wavelength band of a high spectral distribution of the light generated by the light source lamps, or in the case there is formed an image with a color toner corresponding to a wavelength band for which the spectral sensitivity of the photosensitive member is high, there are used light source lamps with low efficiency or the number of the light source lamps to be turned on is reduced. Hereby, the quantity of the spectrum corresponding to a wavelength band of a low spectral distribution of the light generated by the light source lamps can be increased and the quantity of the spectrum corresponding to a wavelength band for which the spectral sensitivity of the photosensitive member is low can be increased, so that the lack of the quantity of light to be applied to an original document and the low spectral sensitivity of the photosensitive member can be compensated. Therefore, when a copying operation is performed on an original document with regular density of the chromaticity of the respective three primary colors, there appears no irregularity in the chromatic density of the image to be formed.

DETAILED DESCRIPTION OF THE PREFERRED EMBODIMENT

Figure 1:
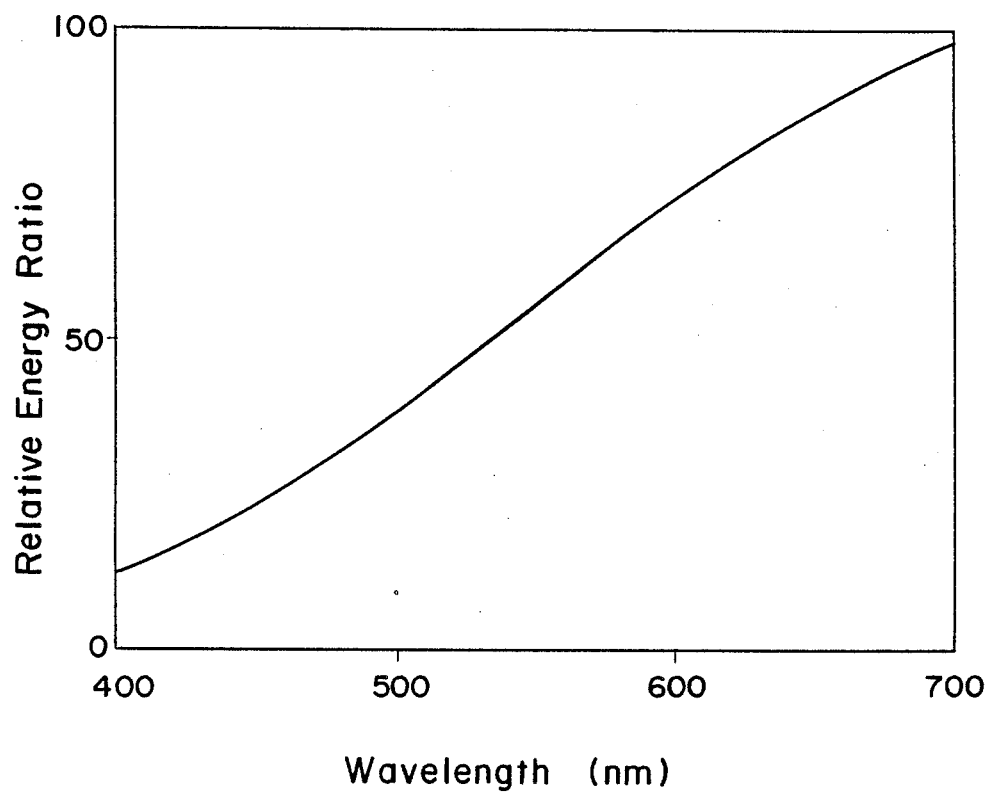
FIG. 1 is a graph showing a spectral distribution of a quantity of light generated by a halogen tungsten lamp.

In FIG. 1, in a generally central portion of a copying machine body, a photosensitive member 1 of a belt shape is laid between two rollers in right and left sides in a rolling manner around said two rollers. In the peripherals of the photosensitive belt 1, there are provided image forming devices such as a charger 11, developing vessels 12a to 12c and a transfer device 13. The developing vessels 12a, 12b and 12c contain yellow, magenta and cyanic toner respectively. The transfer device 13 comprises a belt shaped induction sheet member and a first transfer charger 13a which is installed in a position facing to the abutment position with the left roller in the photosensitive member 1. Moreover, a second transfer charger 13b is installed in a position for carrying a copying sheet (to be described later) below the transfer device 13.

A platen 2 for placing an original document is provided on the top portion of the copying machine body and below the platen 2 is provided an optical system comprising light source lamps 21 and 22, total reflection mirrors 23 to 27, a lens assembly 28 and a color-separation filter 29. The light source lamps 21 and 22 have respectively their lamp efficiencies of 21.6 lm/W and 25 lm/W. The light source lamp 21 is turned on all the time of three processes of blue, green and red color copying operations to be described later when a full color copying operation is performed but the light source lamp 22 is turned on only in the process of a copying operation with blue spectrum. In other words, the light source lamp 21 is lighted for a period three times longer than the light source lamp 22.

Figure 4:
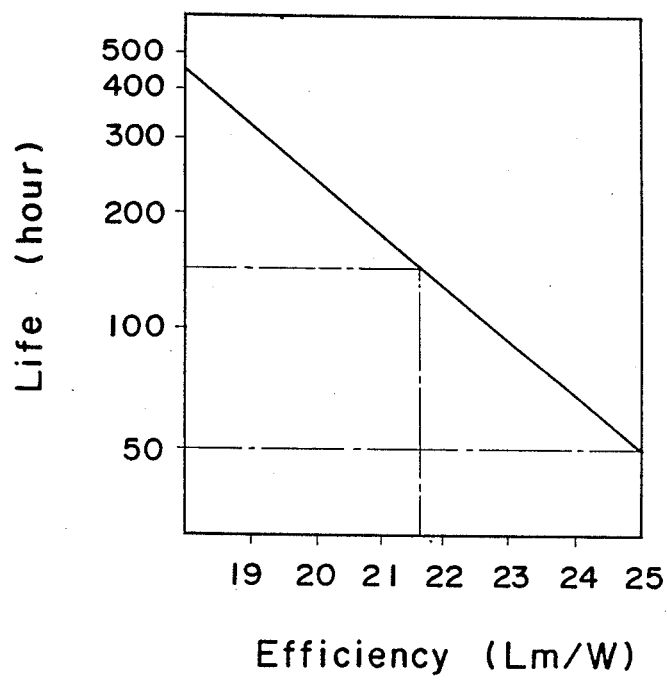
FIG. 4 is a graph showing a relation between a lamp efficiency and a life time of a light source lamp used in the copying machine shown in FIG. 3.

FIG. 4 shows a relation between the lamp efficiency and the life of the light source lamp. As shown in FIG. 4, the life of the light source lamp 21 having a lamp efficiency of 21.6 lm/W is about 150 hours and the life of the light source lamp 22 having a lamp efficiency of 25 lm/W is about 50 hours. That is to say, the life of the light source lamp 21 having a lamp efficiency of 21.6 lm/W is generally three times longer than that of the light source lamp 22 having a lamp efficiency of 25 lm/W. Accordingly, in practical use of the light source lamps 21 and 22 in the copying operation, the life of the light source lamp 21 becomes generally equal to that of the light source lamp 22.

Next, in case of considering the luminous energy (quantity of light bundle), when an electric power of 300 watts with 85 volts is supplied to the light source lamp 21 having an efficiency of 21.6 lm/W, the total luminous energy of the light bundle becomes $21.6 \times 300 = 6480$ (lm). Moreover, when an electric power of 300 watts with 85 volts is supplied to the light source lamp 22 having an efficiency of 25 lm/W, the total luminous energy of the light bundle becomes $25 \times 300 = 7500$ (lm).

If a light source lamp of 21.6 lm/W and a light source lamp of 25 lm/W are used together when a yellow image is formed with yellow toner, the luminous energy of the total light bundles of the two light sources can be sufficiently increased compared to the luminous energy when two light source lamps having the same efficiency of 21.6 lm/W are used under the same condition as mentioned above. Even though two light source lamps of 21.6 lm/W are also used when the yellow image is formed, the luminous energy of the two lamps is not rather sufficient to absorb the difference of the densities of the image, therefore, it is impossible to form an image with sufficient density.

That is to say, comparing the case of using two light source lamps of 21.6 lm/W with the case of using a light source lamp of 21.6 lm/W and a light source lamp of 25 lm/W, the relation between the respective ratio of total luminous energy and the ratio of voltages is represented as follows, $$F/F0 = (V/V0)3.19$$

herein,

F : total luminous energy at the time of input V

F0: total luminous energy at the time of input V0.

And in order to obtain the same luminous energy with a light source lamp of 25 lm/W instead of a light source lamp of 21.6 lm/W, the necessary voltage is as follows.

$$6480/7500 = (x/85)3.19$$

$$x = 81.2(V)$$

Accordingly, if a light source lamp of 25 lm/W and a light source lamp of 21.6 lm/W are used together, the luminous energy can be increased by a voltage of 3.8 volts compared to the case of using two light source lamps of 21.6 lm/W. As described above, since a light source lamp with high lamp efficiency is used for lighting for a short time, the luminous energy can be more increased. Moreover, since the lamp efficiency is good, even though the life of the lamp becomes short, there occurs no problem because of few times of lighting on.

Figure 5:
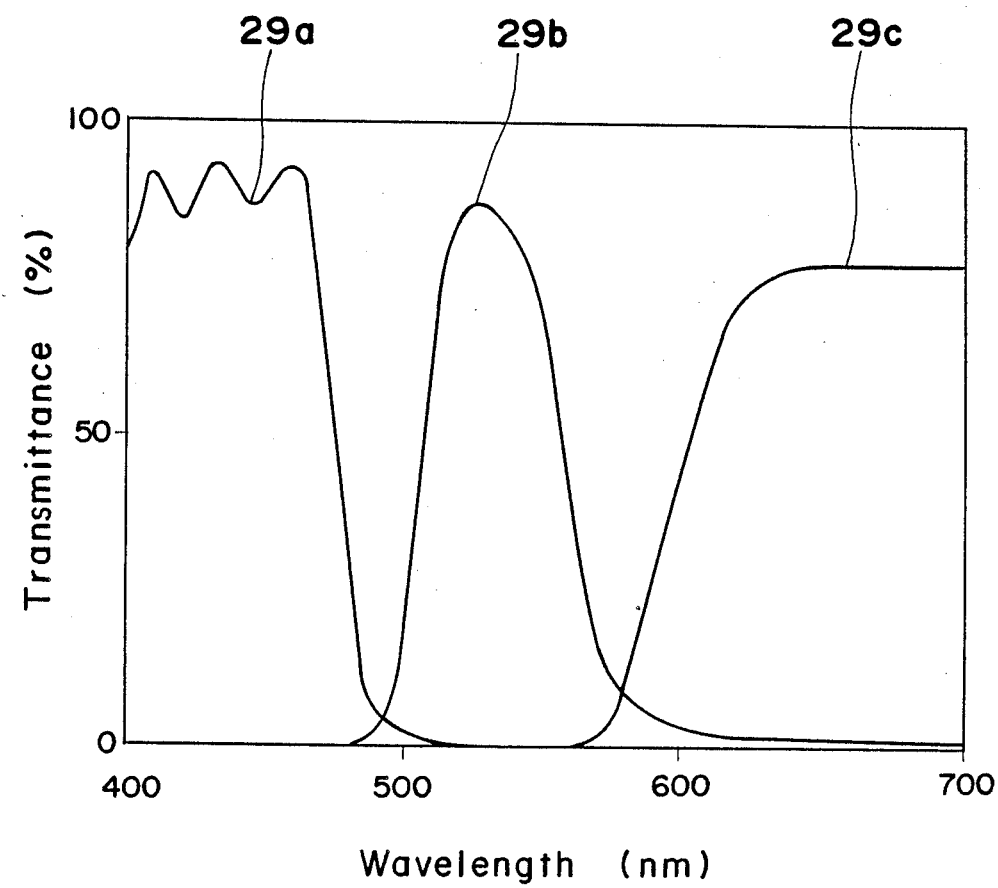
FIG. 5 is a graph showing a transmittance of a color-separation filter.

The color-separation filter device 29 comprises three filters, i.e., a blue filter 29a which is permeable for a spectrum of a blue wavelength band, a green filter 29b which is permeable for a spectrum of a green wavelength band and a red filter 29c which is permeable for a spectrum of a red wavelength band respectively and the three filters mentioned above are removably provided in the optical path of the reflection light reflected by the original document. FIG. 5 shows the transmittance of the respective filters 29a, 29b and 29c. In addition, in the lower portion of the copying machine body, there is provided a sheet carriage portion 3 including sheet feeding cassettes 31 and 32 and a fixing device 33, in which a copying sheet is carried through the transfer device 13.

Figure 6:
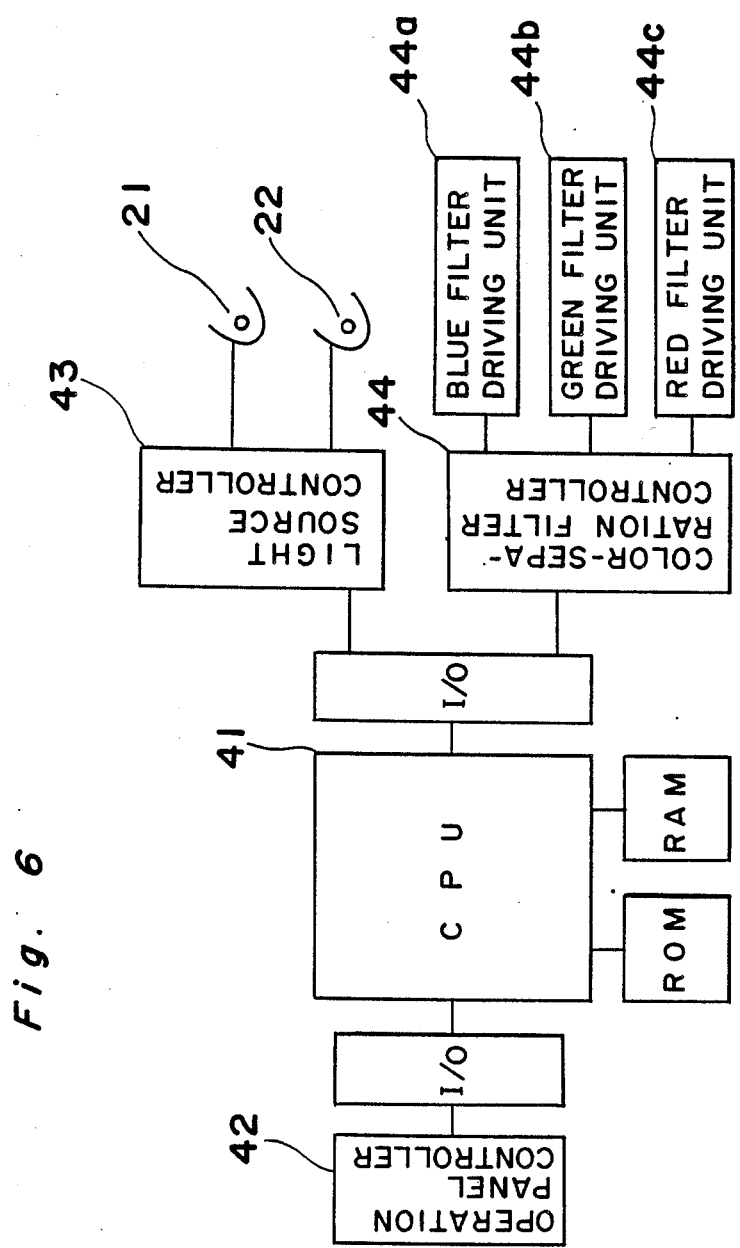
FIG. 6 is a block diagram showing a controller used in the copying machine shown in FIG. 3.

FIG. 6 is a block diagram of a controller unit of the copying machine.

The control of the entire parts of the copying machine is performed by a central processing unit (referred to as CPU hereinafter) 41. There is provided an operation panel (not shown) on the top surface of the copying machine body, in which various signals such as a full color copying starting signal are entered through an operation panel controller 42. In response to these input signals, the CPU 41 transmits operational signals from an input/output unit I/O of the CPU 41 to a light source lamp control unit 43 and a color separation filter control unit 44 in the optical system of the copying machine. The light source lamp control unit 43 controls the on/-off operation of the light source lamps 21 and 22 and the color separation filter control unit 44 operates driving units 44a to 44c of the respective color separation filters 29a to 29c permeable for blue, green and red spectrums respectively so as to install one of the three kinds of color separation filters 29a to 29c in the optical path of the reflection light reflected by the original document.

Figure 2:
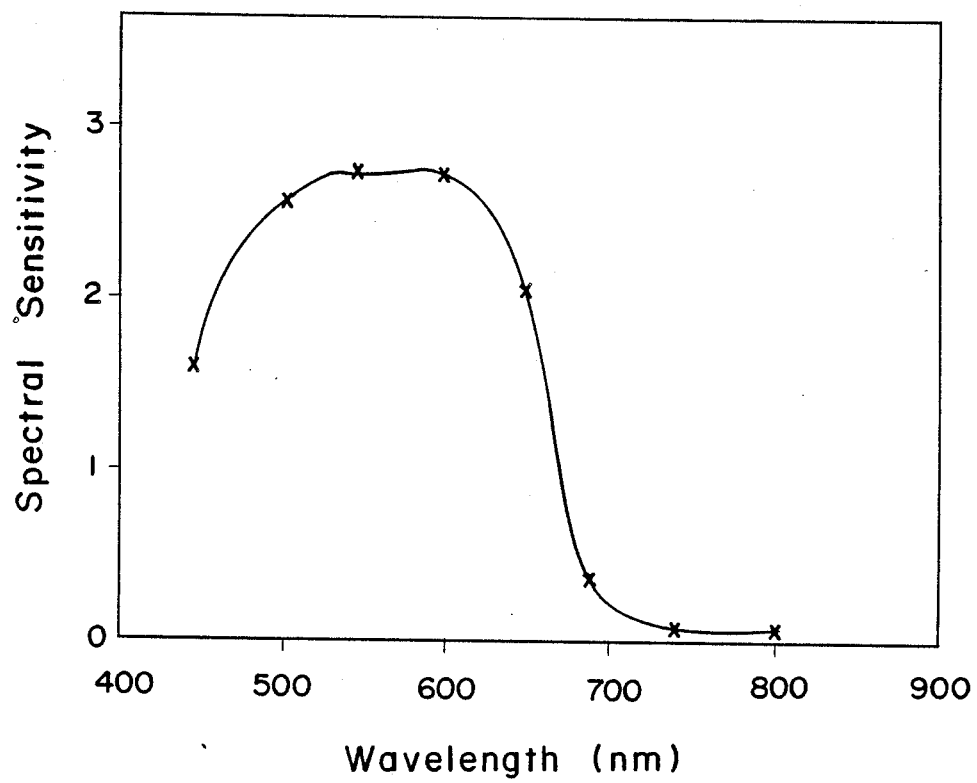
FIG. 2 is a graph showing a spectral sensitivity of a photosensitive member.
Figure 3:
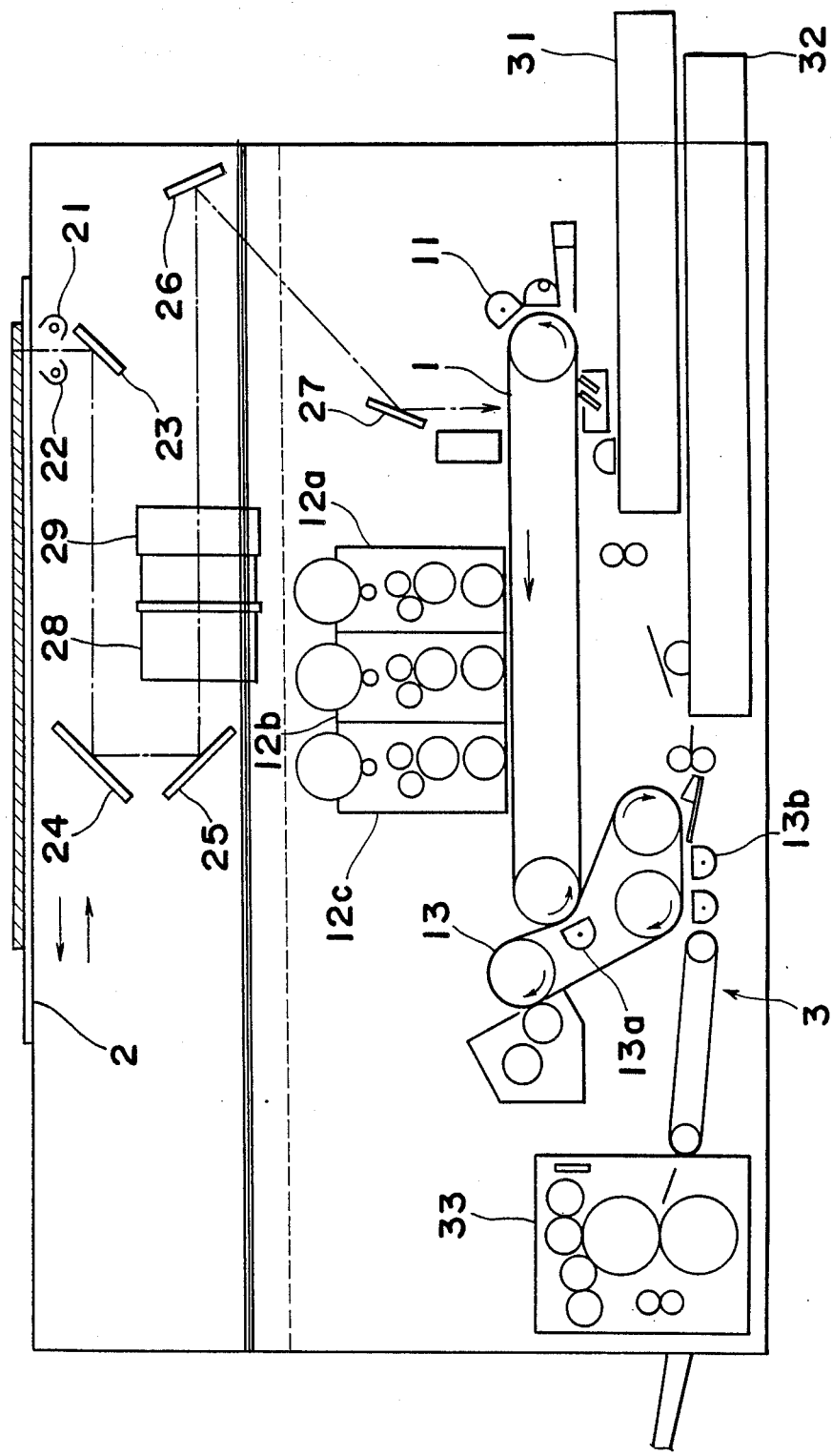
FIG. 3 is a schematic front view showing an embodiment of a full color copying machine according to the present invention.
Figure 7:
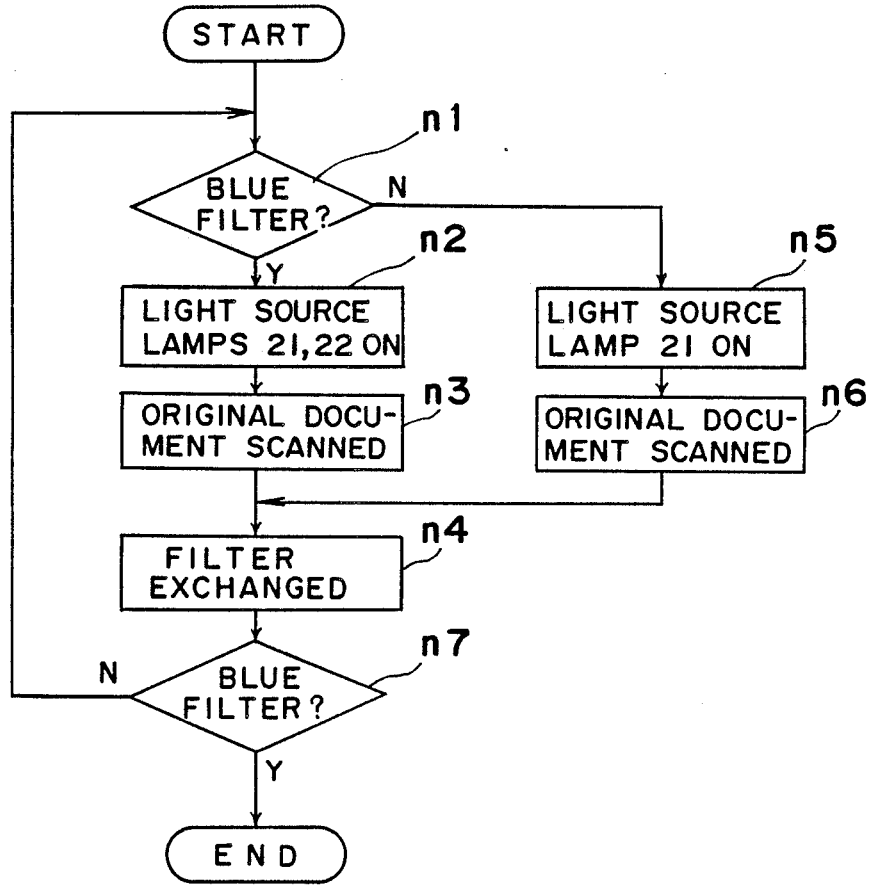
FIG. 7 is a flow chart showing a procedure of an optical system in a full color copying operation.

Next, in FIG. 7, when the full color copying operation is started, it is judged in step n1 which kind (or color) of the color-separation filter 29 is installed in the optical path of the reflection light reflected by the original document. In case the blue color-separation filter 29a is installed in the optical path, both of the light source lamps 21 and 22 are turned on in step n2 and the original document is scanned by the light generated by the light source lamps 21 and 22 in step n3 and the reflection light reflected by the original document is applied to the photosensitive member 1 through the blue color-separation filter 29a. In the case the light source lamps 21 and 22 are both turned on, the total luminous energy of the light bundles generated by the two light source lamps 21 and 22 is 6480+7500=13980 (lm), and therefore, even though the quantity of the spectrum of the blue wavelength band is little included in the light generated by the halogen tungsten lamp (see FIG. 1), or even though the photosensitivity of the photsensitive member 1 for the blue wavelength band is low (see FIG. 2), the photosensitive member 1 can be exposed with sufficient quantity of the spectrum. An electrostatic latent image is formed on the photosensitive member 1 by projecting the blue spectrum transmitted through the blue color-separation filter 29a onto the photosensitive member 1 and there is fed yellow toner from the developing vessel 12a so as to be made adhere onto the electrostatic latent image. The yellow image formed with yellow toner is transferred onto the transfer member 13 through the first transfer charger 13a.

When the first scanning operation of the original document is completed, the blue color-separation filter 29a is removed in step n4, and subsequently, the green color-separation filter 29b is installed and then the red color-separation filter 29c are installed in turn in the optical path of the reflection light reflected by the original document. When the green color-separation filter 29b is installed in the optical path of the reflection light reflected by the original document, only the light source lamp 21 is turned on and the original document is scanned by the light generated by the light source lamp 21 in steps n5 and n6. Accordingly, the quantity of the light bundle at the time of using the green color-separation filter 29b is less than a half of the quantity of the total light bundles at the time of using the blue color-separation filter 29a, but under consideration of the spectral distribution of the light source lamp shown in FIG. 1 and the spectral sensitivity of the photosensitive member 1 shown in FIG. 2 together with the transmittance of the filter shown in FIG. 5, the quantity of the charge on the photosensitive member 1 cancelled by the transmission spectrum transmitted through the blue color-separation filter 29a becomes generally equal to the quantity of the charge on the photosensitive member 1 cancelled by the transmission spectrum transmitted through the green color-separation filter 29b in the case the densities of the chromaticities of the original document are regular. Onto the electrostatic latent image formed on the photosensitive member 1 by projecting the spectrum transmitted through the green color-separation filter 29b, there is fed magenta toner from the developing vessel 12b so as to be fixed onto the electrostatic latent image. And the image with the magenta toner is transferred to the transfer member 13 and is overlapped onto the yellow toner image.

Moreover, the color-separation filter is exchanged in step n4 and the red color-separation filter 29c is installed for the green color-separation filter 29b and the light source lamp 21 is only turned on in step n5 and the original document is scanned by the light generated by the light source lamp 21 in step n6 so as to form an electrostatic latent image. Onto the electrostatic latent image formed on the photosensitive member 1 is fed the cyanic toner from the developing vessel 12c so as to be fixed and the toner image with the cyanic toner fixed is transferred to the transfer member 13, thereby forming a full color compound image with yellow, magenta and cyanic toners on the transfer member 13. The full color compound image with yellow, magenta and cyanic toners formed as described above has no occurrence of a color irregularity since the quantity of the spectrum of the yellow wavelength band is increased by lighting the light source lamps 21 and 22 when the yellow toner image is formed, so that a good image can be obtained.

When the scanning operations of the original document is completed with three steps having the blue, green and red color-separation filters installed respectively, the color-separation filter is further exchanged in step n4. In case the blue color-separation filter 29a is one more installed after the change of the filter in step n7, the scanning operation of the original document for forming the full color image is finished.

In this embodiment, though two light source lamps are provided, any number of light source lamps may be provided and the wavelength band in the spectral distribution of the light generated by the light source lamp or lamps is determined in accordance with the quantity of the spectrum in the spectral distribution of the light of the light source lamp and with the spectral sensitivity of the photosensitive member. In addition, "means for turning on any one or more light source lamps" defined in the present invention corresponds to steps n1, n2 and n5.

As described above, according to the present invention, since any one or more light source lamp or lamps of a plurality of the light source lamps having different efficiencies respectively can be turned on in accordance with the luminous energy of the spectrums of the respective three primary colors of blue, yellow and red in the light generated by the light source lamps and/or the spectral sensitivity of the photosensitive member so as to project an appropriate quantity of light onto the original document, therefore, the difference among the luminous energy of the blue, green and red spectrums in the light generated by the light source lamp and the difference among the spectral sensitivities of the photosensitive member for the respective spectrums of blue, green and red wavelength bands are compensated and the irregularity of the densities of the chromaticities of the image for the respective spectrums can be corrected so as to obtain a good image without a color irregularity. Moreover, though the life time of a light source lamp with high efficiency is short, since the lamp may be lighted merely for a short time when the quantity of the light is required to be increased, the times of exchanging the lamps can be reduced.

What is claimed is:

1. A light source device for use in a color copying machine in which a color image is formed in such a manner that a light bundle is generated by said light source device to be projected onto an original document and that the reflection light reflected by said original document is color-separated so as to be applied onto a photosensitive member, said light source device comprising;
   a plurality of light source lamps having different efficiency respectively and
   means for lighting any number of light source lamp or lamps among said plurality of light source lamps depending on the luminous energy of respective spectrums of three primary colors of blue, green and red, in the light generated by said light source lamps and/or on the spectral sensitivity of the photosensitive member for said respective spectrums.

* * * * *